US012305773B2

(12) United States Patent
Nicolini et al.

(10) Patent No.: US 12,305,773 B2
(45) Date of Patent: May 20, 2025

(54) VALVE FOR PRESSURIZED FLUIDS

(71) Applicant: CAVAGNA GROUP S.P.A., Ponte S. Marco (IT)

(72) Inventors: Giancarlo Nicolini, Villanuova Sul Clisi (IT); Vanni Zacche', Padenghe Sul Garda (IT)

(73) Assignee: Cavagna Group S.P.A., Ponte S. Marco (IT)

( * ) Notice: Subject to any disclaimer, the term of this patent is extended or adjusted under 35 U.S.C. 154(b) by 45 days.

(21) Appl. No.: 18/287,250

(22) PCT Filed: Jun. 7, 2022

(86) PCT No.: PCT/IB2022/055299
§ 371 (c)(1),
(2) Date: Oct. 17, 2023

(87) PCT Pub. No.: WO2022/259148
PCT Pub. Date: Dec. 15, 2022

(65) Prior Publication Data
US 2024/0200684 A1 Jun. 20, 2024

(30) Foreign Application Priority Data
Jun. 11, 2021 (IT) .......................... 102021000015410

(51) Int. Cl.
*F16K 31/524* (2006.01)
*F16K 1/12* (2006.01)
(Continued)

(52) U.S. Cl.
CPC .......... *F16K 31/52408* (2013.01); *F16K 1/12* (2013.01); *F16K 1/42* (2013.01);
(Continued)

(58) Field of Classification Search
CPC ........ F16K 31/52408; F16K 1/12; F16K 1/42; F16K 1/52; F16K 1/44; F16K 17/386;
(Continued)

(56) References Cited

U.S. PATENT DOCUMENTS

| 346,913 A | * | 8/1886 | Heiss .................. F15B 13/0417 |
| | | | 137/596 |
| 535,468 A | * | 3/1895 | Teal ...................... F16K 27/003 |
| | | | 137/636.1 |

(Continued)

FOREIGN PATENT DOCUMENTS

| EP | 3062005 | 8/2016 |
| EP | 3296599 | 3/2018 |

(Continued)

OTHER PUBLICATIONS

Search Report & Written Opinion issued in PCT/IB2022/055299 (Jul. 28, 2022).

*Primary Examiner* — Daphne M Barry
(74) *Attorney, Agent, or Firm* — Barnes & Thornburg LLP (57) ABSTRACT

A valve comprising a valve body having an outflow pipe and comprising a valve seat which defines a first zone of the outflow pipe upstream of the valve seat and a second zone downstream of the valve seat, and a cam follower which is capable of moving with respect to the valve seat along an axis X between an open position, at least one partially open position and a closed position, and comprising a valve head which is capable of moving into abutment in a fluid-tight manner against an abutment surface of the valve seat, a rod which is fixedly joined to the valve head, in such a manner that there is defined a through-opening between a lateral surface of the rod and a corresponding internal surface of the valve seat which faces the lateral surface of the rod, characterized in that the through-opening is equal to a first value (Continued)

A when the cam follower is in the at least one partially open position and is equal to a second value B when the cam follower is in an open position, with B>A.

20 Claims, 7 Drawing Sheets

(51) Int. Cl.
*F16K 1/42* (2006.01)
*F16K 1/52* (2006.01)
*F16K 17/38* (2006.01)
*F16K 31/60* (2006.01)

(52) U.S. Cl.
CPC .............. *F16K 1/52* (2013.01); *F16K 17/386* (2013.01); *F16K 31/602* (2013.01); *F16K 2200/302* (2021.08)

(58) Field of Classification Search
CPC .. F16K 31/602; F16K 2200/302; F16K 1/306; F16K 1/303; F16K 31/52441; F16K 11/00; F16K 11/02; F16K 11/04; F16K 11/072; F16K 27/003
USPC .......................... 137/118.02, 601.12, 614.11
See application file for complete search history.

(56) References Cited

U.S. PATENT DOCUMENTS

| | | | | |
|---|---|---|---|---|
| 672,835 A | * | 4/1901 | Flagg | F16K 31/52408 251/251 |
| 1,619,278 A | * | 3/1927 | Travis | B67D 3/043 137/601.19 |
| 2,409,765 A | * | 10/1946 | Kehle | F16K 11/168 137/635 |
| 3,127,786 A | * | 4/1964 | Hubert | F16K 21/04 74/504 |
| 3,128,635 A | * | 4/1964 | Doolittle | F16K 31/52408 137/630.2 |
| 3,726,312 A | * | 4/1973 | Wognum | F16K 11/168 137/596.2 |
| 4,172,619 A | * | 10/1979 | Anderson | B60T 15/041 303/54 |
| 4,321,947 A | * | 3/1982 | Cech | F16K 31/52 251/263 |
| 4,804,164 A | * | 2/1989 | Nakazawa | F16K 31/52408 138/46 |
| 5,398,725 A | * | 3/1995 | Nakazawa | F16K 11/165 137/636.1 |
| 6,607,007 B1 | | 8/2003 | Hull et al. | |
| 7,922,151 B2 | * | 4/2011 | Petersen | F16K 31/52408 251/251 |
| 8,181,931 B2 | * | 5/2012 | Jennings | E21B 33/0355 251/62 |
| 8,327,880 B2 | * | 12/2012 | Eccles | F16K 37/0066 137/601.12 |
| 9,587,592 B2 | * | 3/2017 | Keefover | F16K 31/53 |
| 10,738,910 B2 | * | 8/2020 | Steffen | F16K 31/52408 |
| 2021/0207728 A1 | * | 7/2021 | Alali | F16K 11/22 |

FOREIGN PATENT DOCUMENTS

| | | |
|---|---|---|
| EP | 3366957 | 8/2018 |
| WO | WO 2019/068970 | 4/2019 |
| WO | WO 2019/068972 | 4/2019 |

* cited by examiner

VALVE FOR PRESSURIZED FLUIDS

CROSS REFERENCE TO RELATED APPLICATIONS

This application is a U.S. nationalization under 35 U.S.C. § 371 of International Application No. PCT/IB2022/055299, filed 7 Jun. 2022, which claims priority to Italian Patent Application No. 102021000015410, filed 11 Jun. 2021. The disclosures set forth in the referenced applications are incorporated herein by reference in their entireties.

TECHNICAL FIELD

The present invention relates to a valve for pressurized fluids having the features set out in the preamble of the main claim.

TECHNOLOGICAL BACKGROUND

Valves of the "soft open" type are known in the art, that is to say, with progressive opening, for pressurized fluids which are typically contained in suitable containers, such as, for example, bottles.

A first known item of prior art provides for the progressive opening of such valves to be obtained by means of a throttling of the flow rate of the flow itself, which is obtained by means of a mechanism which provides for two concentric closure valves which are actuated sequentially by a lever; an example of this solution is, for example, the one set out in EP3062005A1.

However, this construction geometry of the two concentric valves is complicated both from the point of view of the number of single pieces, the construction and assembly thereof, and from the point of view of maintaining the performance levels over time, both in relation to the fluid-tightness thereof and the actuation thereof.

In EP3062005A1, furthermore, the flow of the gas also collides with a number of components of the valve which are subjected to the release of particulates, such as the compression spring 9 which promotes the closure of the valve itself. Compression springs, as a result of the inherent formation thereof, rotate about themselves during the compression and relaxation in order to compensate for the variation of dimensions. During this rotation, there is contact tribology on the respective seats which generates wear and consequently the formation of particulates which can contaminate the gas when these springs are in the path of the gas itself.

A second known item of prior art provides for a mechanism comprising two levers. The first lever, during the opening travel thereof, in a first step actuates a closing system of a very small hole which is calibrated and which, as a result of the small dimensions thereof, allows a throttling of the flow rate of the fluid. This lever subsequently actuates a closure system which acts on a main valve seat. The travel of this first lever from the first step to the second step is prevented by a second lever. The actuation of the second lever allows the first lever to complete the opening travel and therefore the complete passage of the pressurized fluid at the maximum flow rate. An example of this is, for example, solution set out in WO2019068970A1.

A third known item of prior art provides for a mechanism comprising two valves which are arranged in series along an outflow pipe and two levers, each of these valves being actuated by the corresponding lever. One of the two valves is able to throttle the flow of the fluid. An example of this solution is, for example, set out in WO2019068972A1.

However, both these mechanisms provide for a high number of elements and provide, for the actuation thereof, for operation in two or more steps and on more than one lever.

According to a fourth known item of prior art, which is set out, for example, in U.S. Pat. No. 6,607,007B1, the actuation of the valve is given by the relative sliding between two surfaces, in particular of one surface, the surface of the valve head, on the internal surface of the valve seat, until obtaining the fluid-tightness for the closure, and vice versa for the opening action. This rubbing between the two surfaces involves a contact tribology which can cause the formation of particulate which can contaminate the gas itself. Furthermore, this valve is particularly subjected to wear of the sealing gasket, as a result of which the performance levels thereof are subjected to deterioration over time.

Finally, in this solution a potential loss of pressure increases with increasing pressure inside the bottle.

In the technical sector being referred to, therefore, there remains the requirement for having a valve for pressurized fluids which is improved both from the point of view of the complexity of the construction of the individual pieces and the assembly thereof and of the actuation thereof.

DESCRIPTION OF THE INVENTION

The problem addressed by the present invention is to provide a valve for pressurized fluids which is functionally configured to overcome the limitations set out above with reference to the cited prior art.

In the context of this problem, an object of the invention is to provide a valve for pressurized fluids for throttled opening which is easy to construct and actuate.

Another object is to determine a closure geometry with unbalanced surfaces, the extent of the pressure for separation of which ensures the fluid-tightness itself, providing a proportional increase, with the increase in pressure, of the provided separation capacity of the fluid-tight section.

Another object of the invention is to provide a valve, the use of which does not bring about, following friction or wear, contamination of the pressurized fluid.

Finally, an additional object of the invention is to provide a valve which is particularly safe under conditions of potential danger, such as impacts on the valve or the bottle connected to the valve, accidental falls of the bottle, fires.

This problem is solved and this object is achieved by the present invention by means of a valve according to the appended claims.

In a first aspect thereof, therefore, the present invention is directed towards a valve for pressurized fluids, comprising a valve body having an outflow pipe in order to dispense a pressurized fluid and comprising:
  a valve seat which is arranged in the outflow pipe and which defines a first zone of the outflow pipe upstream of the valve seat and a second zone of the outflow pipe downstream of the valve seat, and
  a cam follower which is capable of moving with respect to the valve seat along an axis X between an open position, so as to produce a flow of the fluid being discharged from the valve at a maximum flow rate, at least one partially open position so as to throttle the flow of the pressurized fluid being discharged from the valve, and a closed position, so as to prevent the flow of the fluid through the pipe and comprising:

a valve head which is capable of moving into abutment in a fluid-tight manner against an abutment surface of the valve seat;

a rod with linear movement which is fixedly joined to the valve head.

Preferably, there is defined a through-opening between a lateral surface of the rod and a corresponding internal surface of the valve seat which faces the lateral surface of the rod.

Preferably, this through-opening is equal to a first value A when the cam follower is in the at least one partially open position and is equal to a second value B when the cam follower is in an open position, with B>A.

Preferably, the abutment surface of the valve seat is located in a plane P orthogonal to the axis X.

Advantageously, this valve allows movement from a condition without any flow through the pipe of the valve to a condition of maximum flow, moving through an intermediate step, in which this flow is throttled. This valve is capable of bringing about this throttled flow with a smaller number of elements and a greater constructive simplicity with respect to the prior art.

Furthermore, the person skilled in the art will appreciate that the present solution ensures a closure fluid-tightness which is proportional to the pressure of the bottle, therefore the greater the internal pressure of the bottle is, the greater is the closure force of the valve itself.

Another advantage of the present solution is that any misalignments between the rod and the internal surface of the valve seat do not have any repercussions on the fluid-tightness of the valve itself.

Furthermore, because there are no rubbing actions in the outflow pipe of the gas between the elements which compose the valve itself, there is no formation of particulates. In this manner, the gas maintains its original degree of purity.

Advantageously, the value of this throttling can be established in a planning step by varying the geometry which determines this second value A.

In some embodiments, the abutment surface has a circular crown-like shape.

Preferably, the centre of this circular crown is located in the axis X.

In one embodiment, this value A is constant for any intermediate position of the cam follower between the closed position and the open position.

In other words, the cam follower is able to move with respect to the valve seat along the axis X between the open position and the closed position, moving through a large number of partially open positions and the through-hole between the lateral surface of the rod and the corresponding internal surface of the valve seat which faces the lateral surface of the rod remains constant for all the large number of partially open positions.

In this manner, it is possible to configure a valve, the throttling value of the flow of which is predetermined and constant during the movement of the cam follower from the closed position to the open position. Preferably, $0<A<0.1B$.

This means that the valve throttles the flow of the fluid to a value greater than 0 and less than 10% of the flow which it has when the cam follower is in the open position, that is to say, with full flow rate.

Preferably, the cam follower is able to move with respect to the valve seat along an axis X between the open position, a partially open position and the closed position.

In one embodiment, the cam follower is able to move with respect to the valve seat along an axis X between the open position, a partially open position and the closed position, the partially open position being configured so as to throttle the flow of the pressurized fluid at a value greater than 0 and less than 10% of the flow which it has when the cam follower is in the open position.

A flow which is throttled in this manner has the advantage of containing the energy quantity which is associated with the expansion of the fluid. The throttling in fact allows pressurization of what is downstream of the valve with a minimal flow rate and the quantity of heat which can be generated during the adiabatic conversion of the fluid is consequently extremely limited.

In this manner, there are prevented phenomena of self-ignition or deflagration which can occur with a rapid expansion of some types of gas, such as, for example, oxygen.

In one embodiment, the rod comprises a first sector near the valve head and a second sector which is in a position remote from the valve head and which has radial dimensions less than the first sector, the cam follower being capable of moving with respect to the valve seat between the closed position, the at least one partially open position, in which the through-opening is defined between a lateral surface of the first sector of the rod and the corresponding internal surface of the valve seat which faces the lateral surface of the rod and is equal to the first value A, and the open position, in which the through-opening is defined between a lateral surface of the second sector of the rod and the corresponding internal surface of the valve seat which faces the lateral surface of the rod and is equal to the second value B.

Advantageously, this allows the flow of the fluid to be throttled by suitably planning the relative dimensions of this first sector of the rod and the internal surface of the valve seat.

Preferably, the internal surface of the valve seat and the first sector of the rod both have a cylindrical and concentric geometry.

The term "concentric geometry" is intended to be understood to mean that the axes of both the cylinders are located in the axis X.

Advantageously, this geometry allows both ease of production and ready cooperation between the two pieces, also taking into account any tolerances resulting from the processing thereof or the assembly of the valve itself.

In one embodiment, the valve head is arranged in the first zone upstream of the valve seat and is configured so as to be urged so as to close the valve seat by the flow of the pressurized fluid through the outflow pipe.

This technical feature affords the advantage of increasing the safety of the valve itself.

In one embodiment, when the cam follower is in the closed position, the force which keeps the valve closed is proportional to the pressure of the fluid in the first zone upstream of the valve seat.

In this manner, for the geometry itself of the valve, the closure fluid-tightness increases with the increase of the pressure of the pressurized fluid upstream of the valve seat. The result is a valve which increases the performance levels thereof from the point of view of the inherent safety under conditions where the danger increases.

In one embodiment, the rod extends in a sliding manner through the valve seat between the first zone and the second zone of the outflow pipe, preferably the valve head is arranged in the first zone upstream of the valve seat and is configured so as to be urged so as to close the valve seat by the flow of the pressurized fluid through the outflow pipe and the rod extends in a sliding manner through the valve seat between the first and the second zone of the outflow pipe.

Preferably, the valve comprises first resilient means which are capable of keeping the cam follower in a closed position, the first resilient means preferably being external with respect to the outflow pipe.

Advantageously, the condition that they are external with respect to the outflow pipe prevents contaminations of the fluid with any particles which result from friction and wear.

In one embodiment, these first resilient means are one or more compression springs, which are preferably received between an abutment present on the valve body and an abutment present in the cam follower.

Preferably, the abutment present on the valve body is internal.

Preferably, the abutment present on the cam follower is external.

Preferably, these first resilient means are a compression spring, in which the rod is slidingly received.

In one embodiment, the valve comprises actuation means for moving the cam follower with respect to the valve seat between the closed position, the at least one partially open position and the open position, the actuation means preferably being external with respect to the outflow pipe.

This technical feature also prevents contaminations of the fluid with any particles resulting from friction and wear.

Preferably, these actuation means are manual control means which comprise, for example, push-buttons or levers.

In one embodiment, these actuation means comprise a lever and an eccentric connection, the lever being connected by means of the eccentric connection to the cam follower in such a manner that the rotation of the lever about a hinging axis Y brings about the linear movement along the axis X of the cam follower with respect to the valve seat between the closed position, the at least one partially open position and the open position.

This allows ease of control of the opening of the valve in order to obtain both the throttled flow and the full flow of the pressurized fluid through the valve itself.

Preferably, the eccentric connection is a cam having such a profile as to move the cam follower with respect to the valve seat between the closed position, at least one partially open position and the open position.

Preferably, the cam follower comprises an interface element between the actuation means and the rod, typically a ball or a wheel.

This allows the wear to be limited as a result of the repeated use of the actuation means on the cam follower.

Preferably, the interface element is made of a melting material.

This advantageously involves, if a fire is established, there no longer being any transmission of the movement from the action means to the cam follower.

In one embodiment, the lever is capable of rotating about the hinging axis Y through an angle $\alpha$, the cam follower being in the closed position when the rotation of the lever is $0°$, in the at least one partially open position when the rotation of the lever is equal to an angle greater than $0°$ and less than or equal to $\alpha/2°$ and in an open position when the rotation of the lever is equal to an angle greater than $\alpha/2°$ and less than or equal to $\alpha$.

Preferably, the cam has a profile having at least a first portion, a second portion having a circular-arc-like profile with a centre which is located on the hinging axis Y and having a radius a, and a third portion having a circular-arc-like profile with a centre which is located on the hinging axis Y and having a radius b, with b>a, the first portion corresponding to a rotation of the lever which is equal to $0°$, and wherein the cam follower is in a closed position, the second portion corresponding to a rotation of the lever through an angle greater than $0°$ and less than or equal to $\alpha/2°$, wherein the cam follower remains in the at least one partially open position, and the third portion corresponding to a rotation of the lever between an angle greater than $\alpha/2°$ and an angle less than or equal to $\alpha°$, wherein the cam follower remains in the open position.

Preferably, the second portion corresponds to a rotation of the lever through an angle greater than $0°$ and less than $\alpha/2°$ and between the second portion and the third portion of the profile of the cam a first connection portion is present so that, during the rotation of the lever from an angle less than $\alpha/2°$ to an angle greater than $\alpha/2°$, it is necessary, at an angle equal to $\alpha/2°$, to apply a force greater than the one required for the rotation from an angle of $0°$ to an angle of $\alpha/2°$ and from an angle of $\alpha/2°$ to an angle of $\alpha°$.

This involves the operator being able to perceive and control, during the opening of the valve, the passage of the pressurized fluid from a throttled flow condition to a maximum flow condition.

Preferably, there are present between the third portion and the first portion of the profile of the cam a second connection portion and a breakable shank, the connection portion having a circular-arc-like profile with a centre which is located on the hinging axis Y and having a radius c, with c<b and the breakable shank being between the second connection portion and the first portion, and such that, for a rotation of the lever through an angle greater than $\alpha°$, the breakable shank breaks and the cam follower is moved from the open position to the closed position.

Advantageously, this allows a further increase in the safety of the valve. In fact, if the lever is subjected to a rotation about an angle greater than $\alpha°$, for example, as a result of an impact or being forced by the operator, the breakable shank breaks, for example, following an impact with a projecting element of the valve, and the cam follower returns to the closure position.

In one embodiment, the valve comprises at least one element, preferably two elements, for moving the cam follower into the closed position when the lever is rotated through an angle between $0°$ and $\alpha/2°$ and is not maintained manually, and in the open position when the lever is rotated through an angle between $\alpha/2°$ and $\alpha°$ and is not maintained manually.

Advantageously, this involves the lever being bi-stable and this further increases the safety of the valve which, if the operator should abandon the lever itself, automatically moves so as to close if it is rotated about an angle between $0°$ and $\alpha/2°$ or so as to open for an angle between $\alpha/2°$ and $\alpha$.

Preferably, the at least one element is a resilient means, more preferably a traction spring, which is fixed at a first end to the eccentric movement at a location which does not coincide with the hinging axis Y of the lever and which is fixed at a second end to the cam follower.

In one embodiment, the eccentric movement is a cam and the at least one element are two traction springs which are hinged at the first end to the cam at opposite sides and in such a manner that the hinging locations of the traction springs to the cam identify a hinging axis Z which is eccentric with respect to the hinging axis Y.

This embodiment is particularly balanced from the point of view of balancing the bi-stability mechanism and being easy to construct.

In one embodiment, the two traction springs carry the cam follower into the closed position when the lever is rotated through an angle greater than $\alpha°$.

In a preferred embodiment, the valve comprises both two traction springs which are hinged at the first end to the cam at opposite sides and in such a manner that the hinging locations of the traction springs to the cam identify a hinging axis Z which is eccentric with respect to the hinging axis Y, and a compression spring which is received between an abutment present on the valve body and an abutment present in the cam follower, and both the two traction springs and the compression spring carry the cam follower into the closed position when the lever is rotated about an angle greater than $\alpha°$.

In one embodiment, the valve head has a seat for receiving a fluid-tight element which is capable of moving into abutment against the abutment surface of the valve seat when the cam follower is in a closed position, the valve seat being spaced apart from the abutment surface of the valve seat and being configured in such a manner that, in the absence of the fluid-tight element, the valve head can carry out a maximum travel L along the axis X until the seat abuts the abutment surface of the valve seat, the actuation means and the cam follower being spaced apart by a value D when the cam follower is in a closed position so that $D \geq L$.

Advantageously, this allows the valve to close if the fluid-tight element is no longer there or if it is damaged, for example, following phenomena of combustion.

The features and advantages of the invention will be better appreciated as a result of the detailed description of a preferred embodiment thereof, which is illustrated by way of non-limiting example with reference to the appended drawings, in which.

With reference to the appended Figures, there is generally designated 1 a valve according to the present invention.

Figure 1:
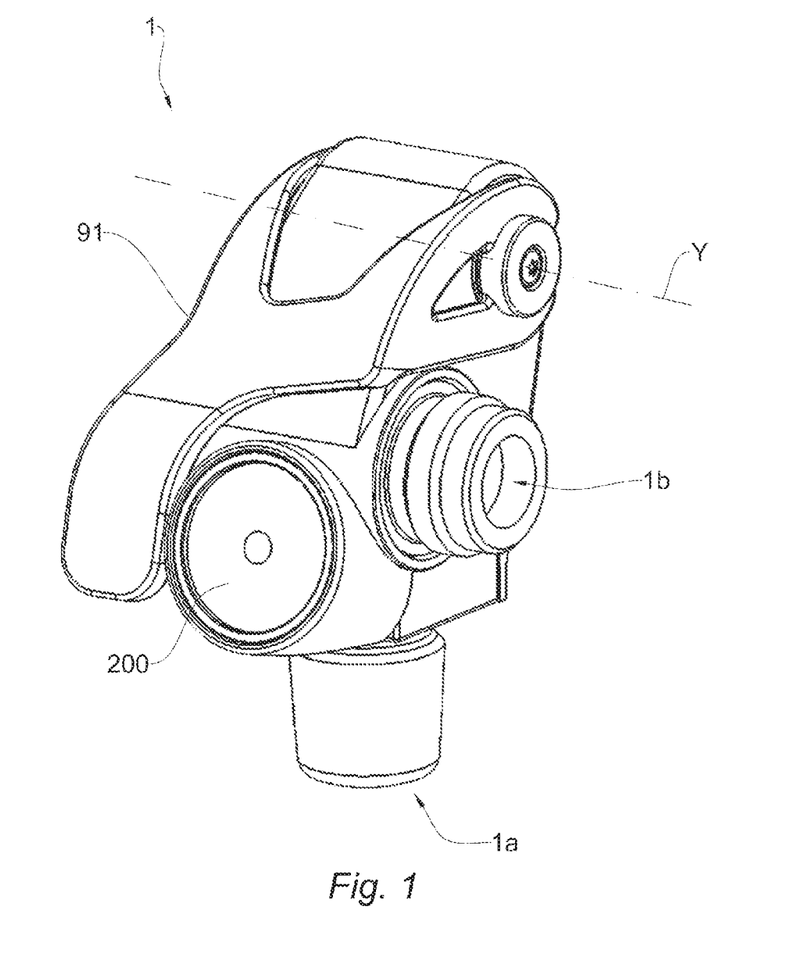
FIG. 1 is a schematic view of a valve with a lever.

FIG. 1 shows a valve 1 for pressurized fluids which typically comprises a lever 91 for opening and closing the valve itself, preferably a display 200, an inlet 1a which is provided for connection to a container which contains a pressurized fluid, such as, for example, a gas bottle, and an outlet 1b which is provided for connection to a device which is able to receive this fluid.

Figure 2:
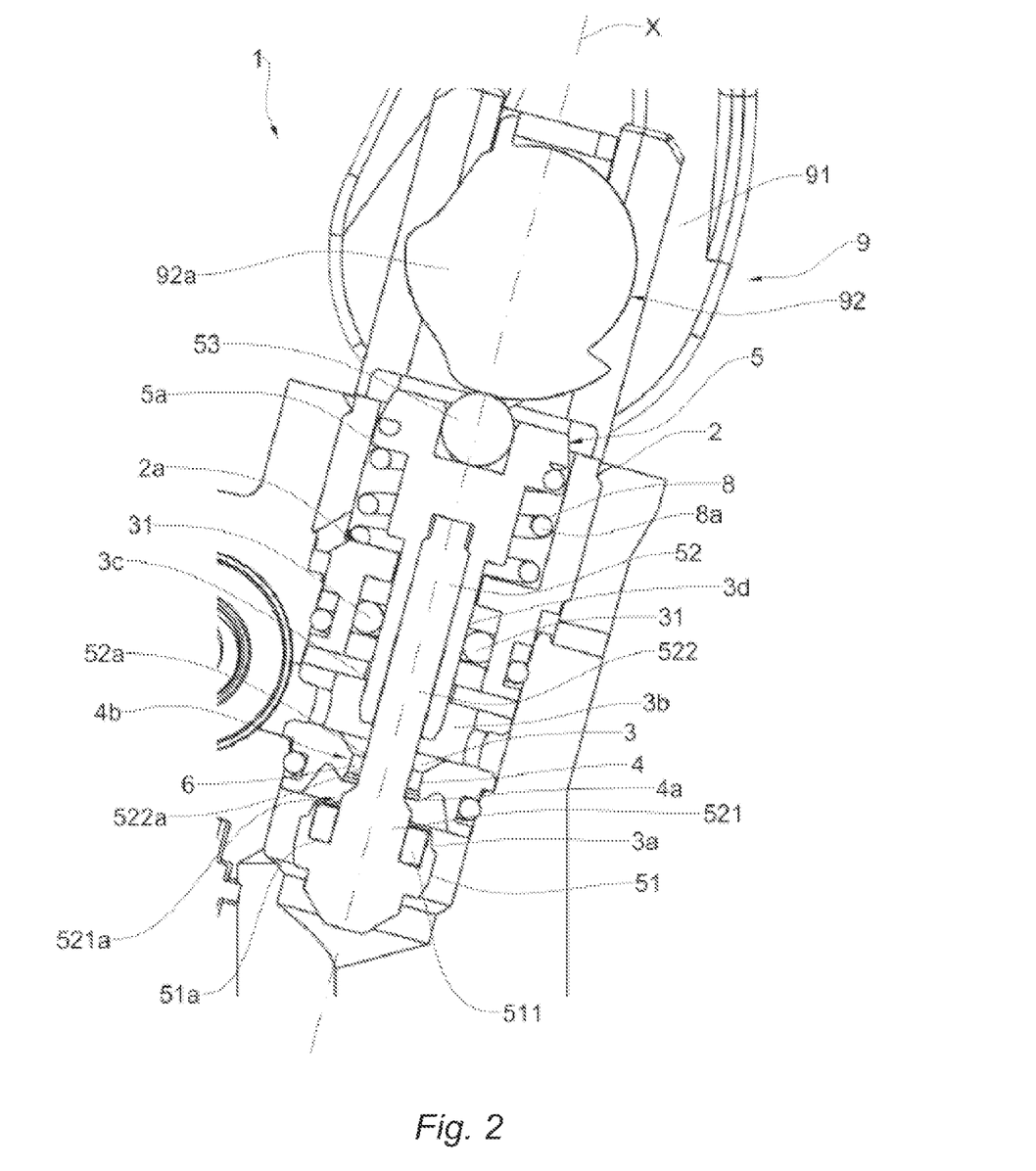
FIG. 2 is a schematic cross-section of a detail of the valve according to the present invention with the cam follower in an open position.

FIG. 2 depicts a schematic cross-sectional view of a detail of the valve according to the present invention.

The valve 1 may comprise, in terms of the most general units thereof, a valve body 2 which receives an outflow pipe 3 and a valve seat 4 which is arranged in the outflow pipe 3 itself so as to define a first zone 3a of the outflow pipe 3 upstream of the valve seat 4 and a second zone 3b downstream of the valve seat 4.

The valve further has a cam follower 5 which can move with respect to the seat of the valve 4 along an axis X between an open position, a partially open position and a closed position.

The valve body 1 further has a hole 3c which is located on the axis X, this hole 3c extending between the second zone 3b and a zone 3d outside the outflow pipe 3.

In the open position (FIG. 2), the pressurized fluid flows in the outflow pipe 3 through the valve seat 4 at a maximum flow rate B which is given by the geometry of the valve 1 itself with the cam follower 5 in the open position and by the pressure of the fluid upstream of the valve 1. In the partially open position (FIG. 4), the pressurized fluid flows in the pipe 3 through the valve seat 4 at a flow rate which has a value A which is clearly defined and which is less than the maximum flow rate and which is given by the geometry of the valve 1 itself with the cam follower 5 in the partially open position and by the pressure of the fluid upstream of the valve 1. In the closed position (FIG. 3), however, there is no flow at all of the fluid through the outflow pipe 3 of the valve 1.

The cam follower 5 comprises a valve head 51 which is received in the first zone 3a of the outflow pipe 3 upstream of the valve seat 4 and which is configured so as to be urged so as to close the valve seat 4 by the pressurized fluid flow in the outflow pipe 3, therefore moving into abutment in a fluid-tight manner against an abutment surface 4a of the valve seat 4 and preventing the flow of the fluid through the valve 1.

Figure 3:
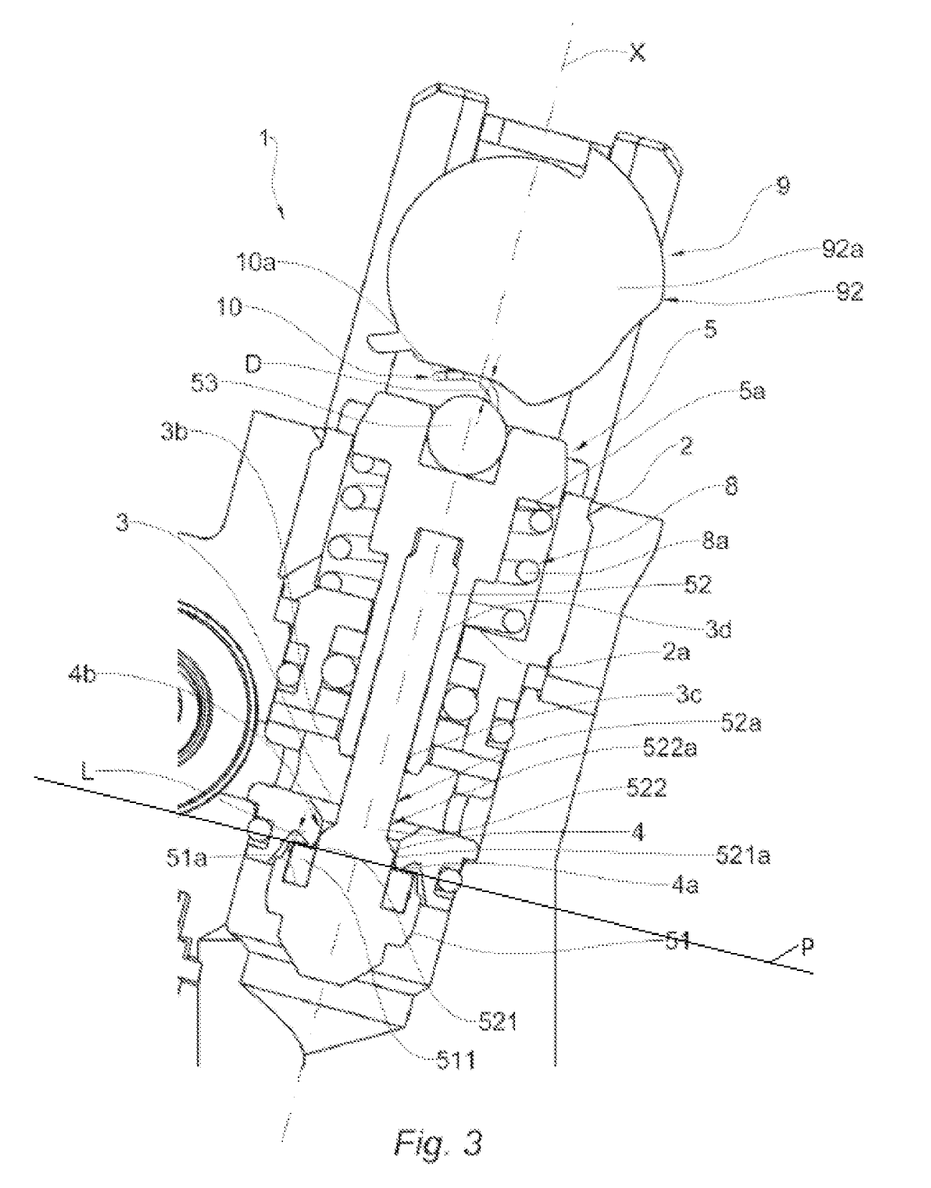
FIG. 3 is a schematic cross-section of the valve according to the present invention with the cam follower in a closed position.

This abutment surface 4a is located in a plane P orthogonal to the axis X, as can be seen in FIG. 3, and has a circular crown-like shape with a centre extending through the axis X itself.

The cam follower further comprises a rod 52 with linear movement along the axis X which is fixedly joined at one end to the valve head 51 and which moves in a sliding manner through the valve seat 4 between the first zone 3a and the second zone 3b of the outflow pipe 3 and between the second zone 3b and the zone 3d outside the outflow pipe 3 through the hole 3c. Suitable fluid-tight elements 31 ensure that the passage of the fluid through the hole 3c is prevented.

By controlling the cam follower 5 in terms of movement along the axis X, the rod 52 slides through the hole 3c and the valve seat 4, bringing the valve head 51 into abutment against the abutment surface 4a of the valve seat 4, therefore preventing the pressurized fluid from flowing through the outflow pipe 3, or, in a position which is remote from the valve seat 4 itself, allowing the fluid itself to flow in the outflow pipe 3.

As can be seen in FIGS. 2 and 3, the rod 52 has a first sector 521 which has a cylindrical geometry and which is fixedly joined to the valve head 52 and a second sector 522 in a remote position with respect to the valve head 51; this second sector 522 has radial dimensions less than the first sector 521.

The valve seat 4 has an internal surface 4b with a cylindrical geometry between the first zone 3a and the second zone 3b of the outflow pipe 3, which a corresponding lateral surface 52a of the rod 52 faces.

A through-hole 6 is defined between the internal surface 4b of the valve seat 4 and the corresponding lateral surface 52a of the rod 52.

When the first sector 521 engages with the internal surface 4b of the valve seat 4 (FIG. 4), the cam follower 5 is in a partially open position while, when the first sector 521 is not engaged with the internal surface 4b of the valve seat 4, which is therefore engaged by the second sector 522 (FIG. 2), the cam follower 5 is in an open position.

Figure 4:
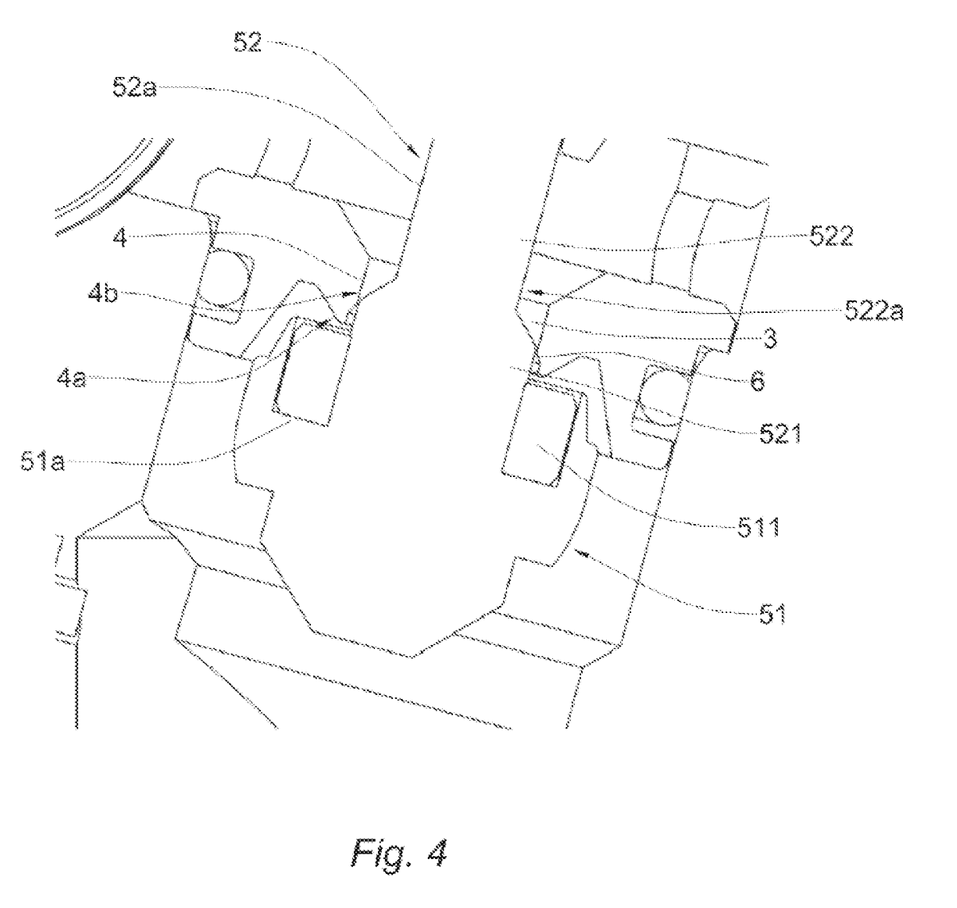
FIG. 4 is a cross-section of a detail of the valve according to the present invention with the cam follower in a partially open position.

Consequently, this through-hole 6 has a first value A when the first sector 521 of the rod 52 faces the internal surface 4b of the valve seat and a second value B when the second sector 522 of the rod 52 faces the internal surface 4b of the valve seat.

Since the second sector 522 has radial dimensions less than those of the first sector 521, B>A.

This means that, when the through-hole 6 has a value A, the flow rate of the pressurized fluid is throttled with respect to the maximum flow rate, which it has instead when the through-hole 6 is equal to the value B.

With reference to FIG. 2, at the opposite end of the valve head 51, the cam follower 5 has an external abutment 5a. The valve body 2 also has an internal abutment 2a. Between the two abutments 5a and 2a, there is present a compression spring 8a which slidingly receives the rod 51 and which is such that the cam follower 5 is forced into the closed position.

In particular, the compression spring 8a receives the portion of the rod 51 which is in a position opposite the valve head 51 with respect to the hole 3c of the valve body 2; therefore, this spring 8a is external with respect to the outflow pipe 3 and is therefore no longer covered by the flow of the fluid which flows through the outflow pipe 3.

Suitable fluid-tight elements 31 prevent the passage of the pressurized fluid from the outflow pipe 3 to the compression spring 8a.

In a closed position, as set out and clearly visible in FIG. 3, the cam 92a and the cam follower 5 are spaced apart, this spacing being equal to a value D.

The valve head 51 has a seat 51a in which a fluid-tight element 511, which moves into abutment against the abutment surface 4a of the valve seat 4 when the cam follower 5 is in a closed position, is received.

The valve seat 4 is spaced apart from the abutment surface 4a of the valve seat 4.

The valve seat 4 and the valve head 51 are configured in such a manner that, in the absence of the fluid-tight element 511, the valve head 51 can carry out a maximum travel L along the axis X until the seat 51a abuts the abutment surface 4a of the valve seat 4.

Since D≥L, if the fluid-tight element 511 is damaged, the cam follower 5 moves along the axis X until ensuring that the valve 1 is closed.

Figure 7:
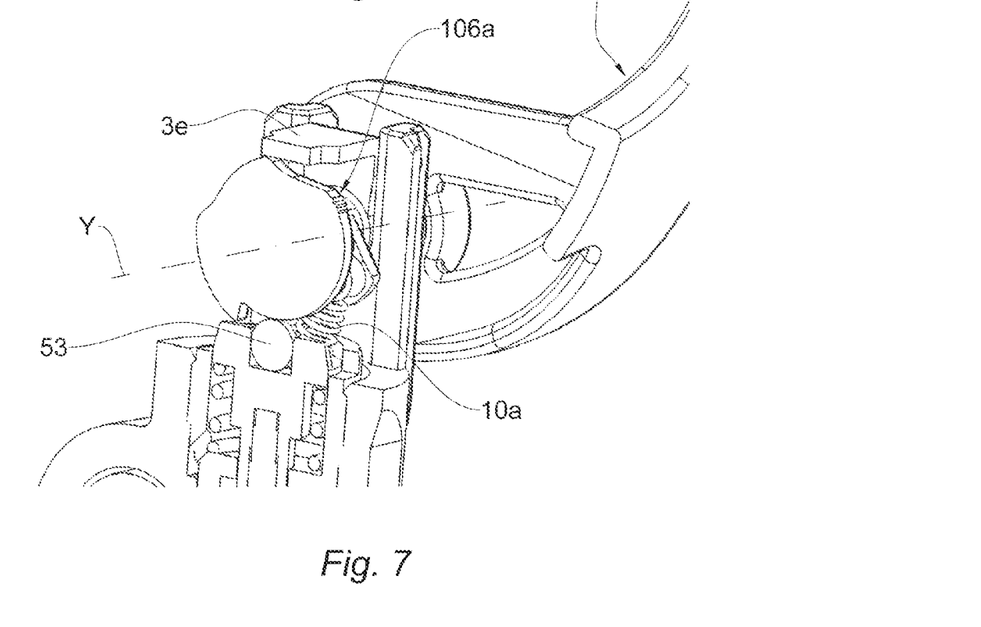
FIG. 7 is a schematic, perspective cross-section of a detail of the valve according to the present invention for an angle of rotation of the lever greater than $\alpha°$.
Figure 8:
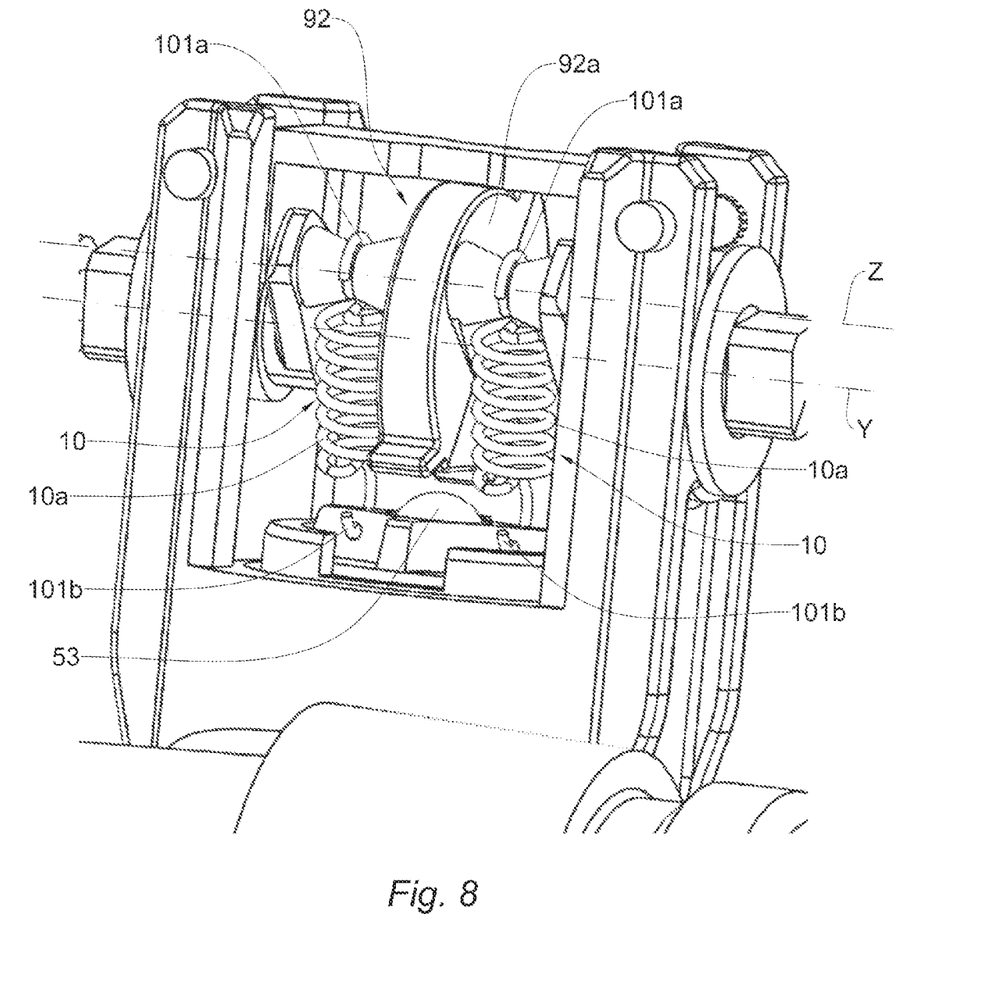
FIG. 8 is a schematic, perspective view of a detail of the valve according to the present invention.

The valve 1 further has a lever 91 which is hinged about a hinging axis Y, as can be seen in FIG. 1, FIG. 7 and FIG. 8, and which is such as to rotate through an angle α.

This lever 91 is connected to a cam 92a outside the outflow pipe 3 and controls, via the cam 92a, the movement with respect to the valve seat 4 of the cam follower 5 along the axis X between the closed, partially open and open positions.

In particular, the cam follower 5 is in a closed position when the rotation of the lever 91 is equal to 0°, in a partially open position when the rotation of the lever 91 is equal to an angle greater than 0° and less than or equal to α/2° and in an open position when the rotation of the lever 91 is equal to an angle greater than α/2° and less than or equal to a.

As FIGS. 2 to 8 show, the cam follower 5 comprises a ball 53 between the cam 92a and the rod 52, this ball being made from meltable material.

This technical feature is such as to be also able to be applied to other types of valves with respect to the valve of the present invention.

As FIG. 8 shows, the valve further comprises two traction springs 10a, which are hinged at a first end 101a to the cam 92a at opposite sides and in such a manner that the hinging locations of the traction springs 10a to the cam 92a define a hinging axis Z which is eccentric with respect to the hinging axis Y of the lever 91, and which are hinged at the second end 101b to the cam follower 5.

These traction springs 10a, operating in conjunction with the specific geometry of the cam 92 illustrated below, involve the lever 91 being bi-stable, that is to say, involving the cam follower 5 being brought back into a closed position when the lever 91 is rotated about an angle between 0° and α/2° and is not maintained manually, and in an open position when the lever 91 is rotated about an angle between α/2° and α° and is not maintained manually.

This technical feature is such as to be also able to be applied to other types of valves with respect to the valve of the present invention.

Figure 5:
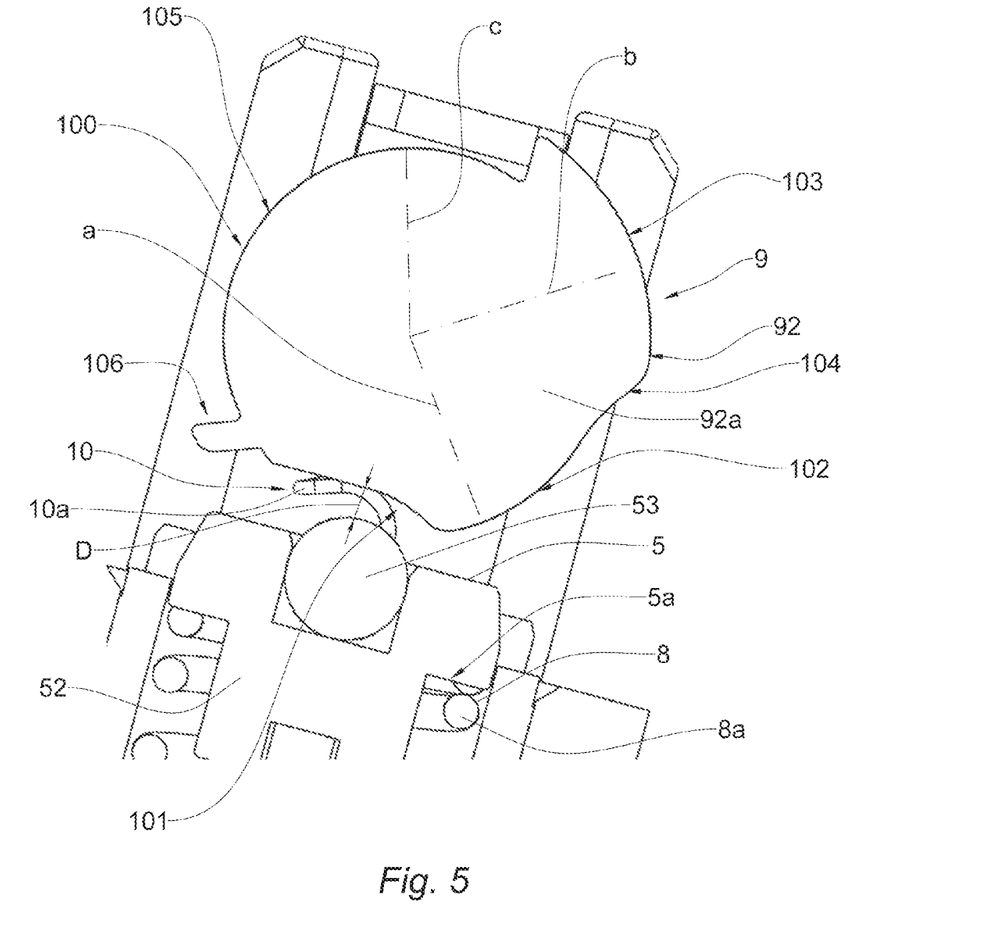
FIG. 5 is a schematic cross-section of a detail of the valve according to the present invention with the cam follower in a closed position.
Figure 6:
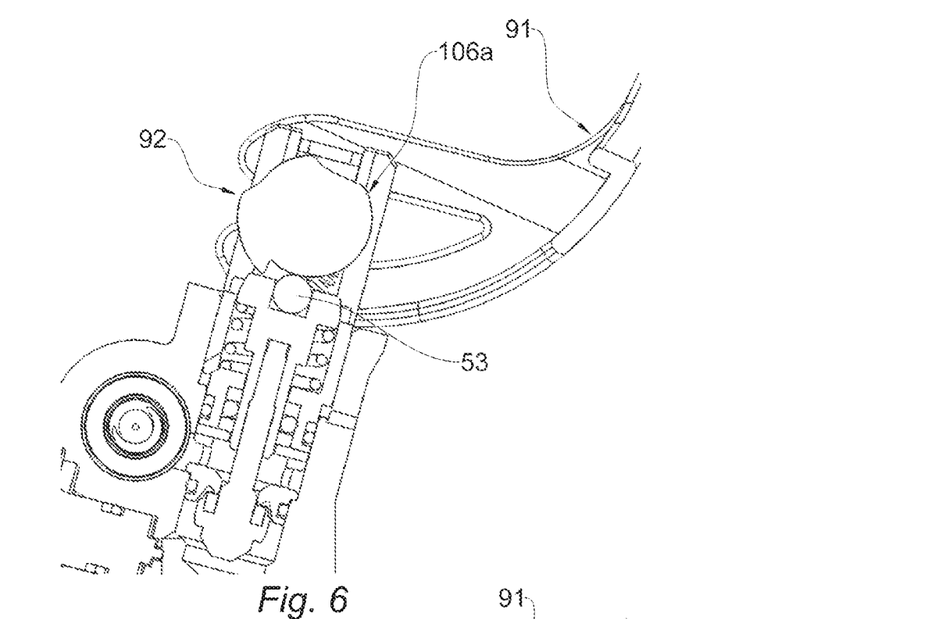
FIG. 6 is a schematic cross-section of a detail of the valve according to the present invention for an angle of rotation of the lever greater than $\alpha$.

As FIG. 5 shows, the cam 92a has such a profile 100 that, in the opening direction of rotation of the lever 91, it has successively a first portion 101, a second portion 102, a first connection portion 104, a third portion 103, a second connection portion 105 and a breakable shank 106.

When the lever 91 has a rotation angle equal to 0°, the cam 92a exposes the first portion 101 to the cam follower 5 so that the cam 92a and the cam follower 5 are not in contact, therefore there is no transmission of movement from the cam 92 to the cam follower 5, which is maintained in a closed position by the compression spring 8a and the traction springs 10a.

In this condition, if the bottle which is equipped with this valve is subjected to a dangerous overheating, the melting of the ball 53 involves the valve no longer being able to be opened and it therefore remaining in a stably closed position.

When the lever 91 moves from a rotation angle equal to 0° to an angle equal to α/2°, the cam 92a exposes to the cam follower 5 the second portion 102 having a circular-arc-like profile with a centre which is located on the hinging axis Y and having a radius a, the cam 92a and the cam follower 5 are in contact so that the cam follower 5 is controlled in terms of movement from the closed position to the partially open position, which remains in this state until the cam exposes to the cam follower this second portion 102, that is to say, for any angle between 0° and α/2°.

When the lever 91 moves from a rotation angle equal to α/2° to an angle between α/2° and α°, the cam 92 exposes to the cam follower 5 the third portion 103 having a circular-arc-like profile with a centre which is located on the hinging axis Y and a radius b. The cam 92 and the cam follower 5 are in contact but, because b>a, the cam follower 5 is controlled in terms of movement away from the partially open position to the open position, which remains in this state until the cam exposes this third portion 103 to the cam follower, that is to say, for any angle between α/2° and α°.

Between the second portion 102 having a radius a and the third portion 103 having a radius b with b>a, there is present a first connection portion 104, corresponding to a rotation angle of the lever 91 equal to α/2° and such that, when the lever is controlled in terms of rotation from an angle less than α/2° to an angle greater than α/2°, the operator has to apply a peak of force so that the operator him/herself can identify and control the movement of the valve from a condition, in which the fluid is being dispensed at a throttled flow rate, to a condition in which it is dispensed at the maximum flow rate.

This technical feature is such as to be also able to be applied to other types of valves with respect to the valve of the present invention.

Between the third portion 103 and the first portion 101 of the profile 100 of the chamber 92a, there are successively present a second connection portion 105 and a breakable shank 106. The second connection portion 105 has a circular-arc-like profile with a centre which is located on the hinging axis Y and having a radius c, with c<b, so that the cam follower 5 is controlled in terms of movement into the closed position. If, therefore, the lever 91 is forced to rotate to an angle greater than x (FIGS. 6 and 7), the breakable shank 106 strikes a projecting element 3e of the valve 1, breaking at a location 106a, the cam 92a exposes to the cam follower 5 the second connection portion 105 and the cam follower 5 is moved into the closed position by the two traction springs 10a and by the compression spring 8a.

This technical feature is such as to be also able to be applied to other types of valves with respect to the valve of the present invention.

Naturally, in order to comply with specific and contingent application requirements, a person skilled in the art may apply to the above-described invention additional modifications and variants which are still included within the scope of protection as defined by the appended claims.

The invention claimed is:

1. A valve for pressurized fluids comprising a valve body having an outflow pipe in order to dispense a pressurized fluid along a direction of flow from an inlet to an outlet and comprising:
    a valve seat which is arranged in the outflow pipe and which defines a first zone of the outflow pipe upstream of the valve seat with respect to said direction of flow and a second zone of the outflow pipe downstream of the valve seat with respect to said direction of flow, and
    a cam follower which is capable of moving with respect to the valve seat along an axis (X) between an open position, so as to produce a flow of the pressurized fluid being discharged from the valve at a maximum flow rate, at least one partially open position so as to throttle the flow of the pressurized fluid being discharged from the valve, and a closed position, so as to prevent the flow of the fluid through the pipe and comprising:
    a valve head which is capable of moving into abutment in a fluid-tight manner against an abutment surface of the valve seat;
    a rod with linear movement which is fixedly joined to the valve head, in such a manner that there is defined a through-opening between a lateral surface of the rod and a corresponding internal surface of the valve seat which faces the lateral surface of the rod,
    the through-opening being equal to a first value A when the cam follower is in the at least one partially open position and being equal to a second value B when the cam follower is in an open position, with B>A,
    the valve further comprising actuation means for moving the cam follower with respect to the valve seat, the actuation means being external with respect to the outflow pipe and comprise a lever and an eccentric connection, the lever being connected by means of the eccentric connection to the cam follower in such a manner that a rotation of the lever about a hinging axis (Y) brings about the linear movement along the axis (X) of the cam follower with respect to the valve seat between the closed position, at least one partially open position and open position,
    characterized in that the cam has a profile having at least a first portion, a second portion having a circular-arc-like profile with a centre which is located on the hinging axis (Y) and having a radius a, and a third portion having a circular-arc-like profile with a centre which is located on the hinging axis (Y) and having a radius b, with b>a, the first portion corresponding to a rotation of the lever which is equal to 0°, and wherein the cam follower is in a closed position, the second portion corresponding to a rotation of the lever through an angle greater than 0° and less than or equal to $\alpha/2°$, in which the cam follower remains in the at least one partially open position, and the third portion corresponding to a rotation of the lever between an angle greater than $\alpha/2°$ and an angle less than or equal to a° in which the cam follower remains in the open position.

2. The valve according to claim 1, wherein the value A is constant for any intermediate position of the cam follower between the closed position and the open position.

3. The valve according to claim 1, wherein the valve head is arranged in the first zone upstream of the valve seat and is configured so as to be urged so as to close the valve seat by the flow of pressurized fluid in the outflow pipe.

4. The valve according to claim 1, characterized in that, when the cam follower is in the closed position, the force which keeps the valve closed is proportional to the pressure of the fluid in the first zone upstream of the valve seat.

5. The valve according to claim 1, wherein 0<A<0.1B.

6. The valve according to claim 1, wherein the rod comprises a first sector near the valve head and a second sector which is in a position remote from the valve head and which has radial dimensions less than the first sector, the cam follower being capable of moving with respect to the valve seat between the closed position, the at least one partially open position, in which the through-opening is defined between a lateral surface of the first sector of the rod and the corresponding internal surface of the valve seat which faces the lateral surface of the rod and is equal to the first value A, and the open position, in which the through-opening is defined between a lateral surface of the second sector of the rod and the corresponding internal surface of the valve seat which faces the lateral surface of the rod and is equal to the second value B.

7. The valve according to claim 1, wherein the rod extends in a sliding manner through the valve seat between the first zone and the second zone of the outflow pipe.

8. The valve according to claim 1, comprising first resilient means which are capable of keeping the cam follower in a closed position, the first resilient means being external with respect to the outflow pipes.

9. The valve according to claim 8, wherein the first resilient means are one or more compression springs, which are preferably received between an abutment present on the valve body and an abutment present in the cam follower.

10. The valve according to claim 1, wherein the eccentric connection is a cam having such a profile as to move the cam follower with respect to the valve seat between the closed position, the at least one partially open position and the open position.

11. The valve according to claim 1, wherein the cam follower comprises an interface element between the actuation means and the rod, preferably made of a melting material.

12. The valve according to claim 1, wherein the lever is capable of rotating about the hinging axis Y through an angle $\alpha$, the cam follower being in the closed position when the rotation of the lever is 0°, in the at least one partially open position when the rotation of the lever is equal to an angle greater than 0° and less than or equal to $\alpha/2°$ and in an open position when the rotation of the lever is equal to an angle greater than $\alpha/2°$ and less than or equal to $\alpha°$.

13. The valve according to claim 12, wherein the second portion corresponds to a rotation of the lever through an angle greater than 0° and less than $\alpha/2°$ and between the second portion and the third portion of the profile of the cam a first connection portion is present so that, during the rotation of the lever from an angle less than $\alpha/2°$ to an angle greater than $\alpha/2°$, it is necessary, at an angle equal to $\alpha/2°$, to apply a force greater than the one required for the rotation from an angle of 0° to an angle of $\alpha/2°$ and from an angle of $\alpha/2°$ to an angle of $\alpha°$.

14. The valve according to claim 12, wherein there are present between the third portion and the first portion of the profile of the cam a second connection portion and a breakable shank, the connection portion having a circular-arc-like profile with a centre which is located on the hinging axis Y and having a radius c, with c<b and the breakable shank being between the second connection portion and the first portion, and such that, for a rotation of the lever through an angle greater than $\alpha°$, the breakable shank breaks and the cam follower is moved from the open position to the closed position.

15. The valve according to claim 1, comprising at least one element, preferably two elements, for moving the cam follower into the closed position when the lever is rotated through an angle between 0° and $\alpha/2°$ and is not maintained manually, and in the open position when the lever is rotated through an angle between $\alpha/2°$ and $\alpha°$ and is not maintained manually.

16. The valve according to claim 15, wherein the at least one element is a resilient means, preferably a traction spring, which is fixed at a first end to the eccentric movement at a location which does not coincide with the hinging axis Y of the lever and at a second end to the cam follower.

17. The valve according to claim 16, wherein the eccentric movement is a cam and the at least one element are two traction springs which are hinged at the first end to the cam at opposite sides and in such a manner that the hinging locations of the traction springs to the cam identify a hinging axis Z which is eccentric with respect to the hinging axis Y.

18. The valve according to claim 17, wherein the two traction springs carry the cam follower into the closed position when the lever is rotated through an angle greater than $\alpha°$.

19. The valve according to claim 1, wherein the valve head has a seat for receiving a fluid-tight element which is capable of moving into abutment against the abutment surface of the valve seat when the cam follower is in a closed position, the valve seat being spaced apart from the abutment surface of the valve seat and being configured in such a manner that, in the absence of the fluid-tight element, the valve head can carry out a maximum travel L along the axis X until the seat abuts the abutment surface of the valve seat, the actuation means and the cam follower being spaced apart by a value D when the cam follower is in a closed position so that $D \geq L$.

20. The valve according to claim 1, wherein the abutment surface is located in a plane orthogonal to the axis.

* * * * *